Jan. 27, 1931.                F. HOOVER                1,790,544
                    AUTOMOBILE WINDSHIELD SCRAPER
                         Filed April 22, 1929
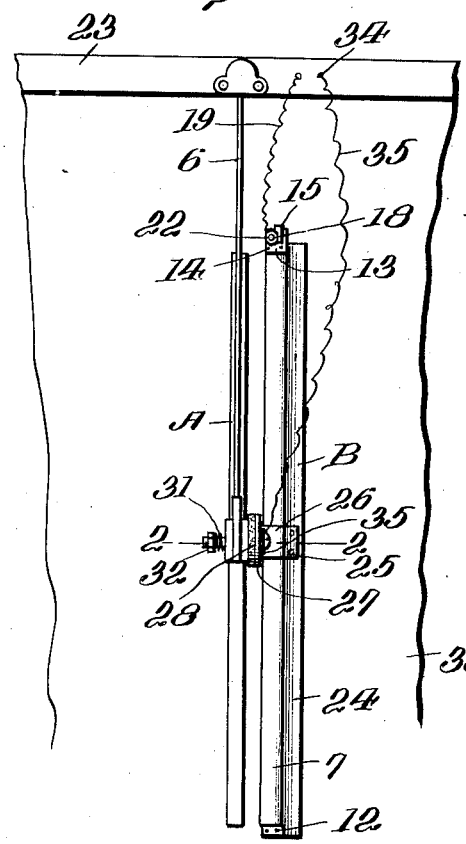
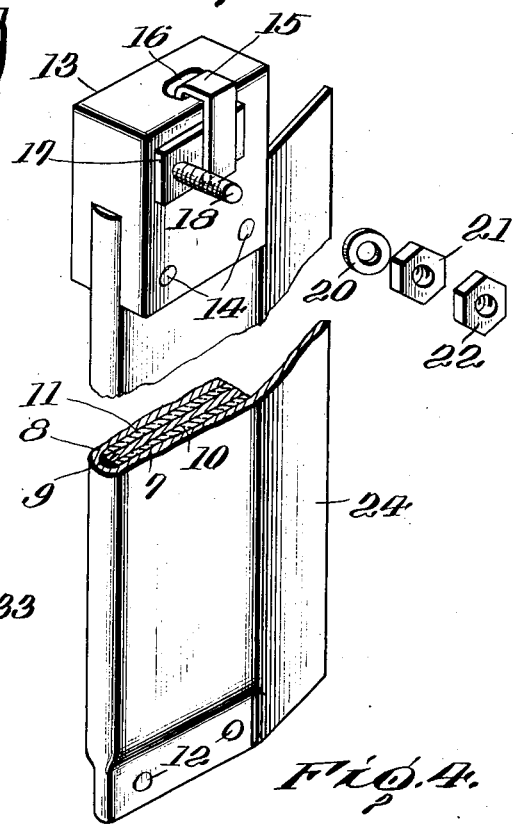
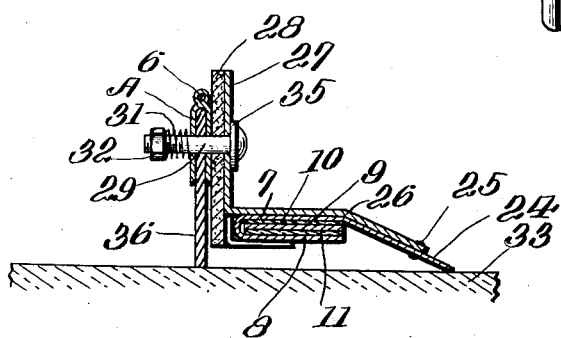
Inventor
F. Hoover
By
Attorneys Patented Jan. 27, 1931

1,790,544

UNITED STATES PATENT OFFICE

FRANK HOOVER, OF WICHITA, KANSAS

AUTOMOBILE WINDSHIELD SCRAPER

Application filed April 22, 1929. Serial No. 357,150.

This invention relates to an improved automobile windshield scraper and more particularly to a device of this character which is electrically heated, and comprises an accessory which can be readily and quickly attached to the common windshield wiper which is in extensive present day use.

One of the objects of the invention is the provision of a scraper which can be readily fastened to the common and well known windshield wiper for the purpose of keeping off and removing frost and ice from the windshield to insure a clear vision.

Another object of the invention is the provision of a device of the character described which is highly efficient in operation and simple and cheap of manufacture.

Other objects, novel features of construction and improved results of the invention will appear from the following description and accompanying drawings.

Figure 1 is a view in elevation of my improved scraper showing its manner of attachment to the ordinary wiper.

Figure 2 is a transverse sectional view through the scraper and the wiper.

Figure 3 is a perspective view, a portion of the view being in transverse section.

Figure 4 is a longitudinal sectional view of one end of the scraper.

The present invention comprises a windshield scraper which is electrically heated and forms an accessory which can be manufactured and sold to automobile owners as an attachment to the common well known windshield wiper which forms a part of the equipment of all automobiles.

Reference now being had to the drawings it will be seen that the well known and commonly used windshield wiper is designated at A while my improved scraper is designated at B. Windshield wipers as commonly used are either operated by an electric motor or by the vacuum in the liquid fuel system and as this forms no part of the present invention no showing is made of the windshield wiper actuating means other than the rod 6 which is attached to one of the forms of driving means in common use.

The scraper forming the subject matter of the present invention is preferably made of a light gauge metal and is of a length slightly in excess of the length of the ordinary windshield wiper and has a body portion composed of a double thickness of material forming parallel walls 7 and 8 carrying therebetween a heating element 9 insulated from the side walls by a suitable insulating material such as mica which is indicated at 11 and 11'. At one end, preferably its lower end, the scraper walls 7 and 8 are brought together and suitably fastened as at 12 by means of a rivet, spot weld or an equivalent. This construction is illustrated in Figure 4 where it will also appear that the heating element 9 is bent backwardly upon itself but upon the outside of the insulating medium 11 for contact with the scraper wall 8.

At its upper end the main body portion carries a block 13 composed of some non-conducting material such as fibre and which is attached to the housing by rivets 14 or the like. The heating element at its upper end is provided with a conductor 15 which comes upwardly through a suitable opening 16 in the block and is bent downwardly for contact with a metallic plate 17 carried upon the outer face of the block. This metallic plate is provided with a threaded stud 18 and to this stud is secured the electric wire or lead 19 by means of suitable bolts and washers 20, 21 and 22. The wire 19 passes through the windshield frame 23 and is connected with the electric battery of the automobile.

The wall 7 of the body portion of the scraper is elongated to form a scraping edge 24 which edge is made perfectly straight and adjusted so that it will fit flat on the glass of the windshield throughout the entire length of the scraper. To properly adjust this edge in contact with the glass it is bent downwardly or inwardly from the wall portions 7.

The scraping edge forms the leading edge of the scraper or the edge which is remote from the ordinary wiper A.

Suitably attached as by spot welds 25 or the like to the scraper intermediate its length is a bracket 26 having a portion or leg 27 which extends upwardly at right angles to the scraper part and carries on its rear wall a suitable insulating medium 28.

The scraper is attached to the windshield wiper by this bracket by means of a bolt 29 which is substituted for a similar bolt which is found in the ordinary windshield wiper and which serves for the purpose of attaching the rod 6 to the wiper and at the remote side of the wiper is provided with a coil spring 31 and a nut 32. This manner of attachment provides a resilient connection between the scraper and the wiper so as to permit and insure that the scraping edge 24 will at all times engage and slide on the glass 33 comprising the windshield.

The electric circuit to the heating element is completed by grounding the scraper to the windshield frame 23 as at 34 by a wire 35 which is attached to and clamped against the scraper by the bolt 29.

It will of course be understood, although it is not shown, that a switch is provided for turning on and off the current to the heating element of the scraper and it will be readily apparent that by turning on the driving medium of the ordinary wiper the scraper will be actuated by and with the wiper. The scraping edge 24 of the scraper will be heated by the heating element and this hot edge will keep any frost or ice on the windshield melted and permit its removal by the scraper and the rubber wiper portion 36 of the wiper A, thus keeping the windshield clean and insuring a clear vision.

From the foregoing description it will also be seen that I have provided an accessory which can be readily and quickly attached to the ordinary windshield wiper without requiring any alteration of the ordinary windshield wiper construction or interfering in any way with its operation.

Additionally the construction is such that the scraper can be very cheaply manufactured and consequently marketed at a low price.

Although the scraper is illustrated in the drawings as being used in conjunction with a wiper it is readily apparent that the scraper could be used alone, without departing from the spirit of the invention, should this be desirable for any reason.

Having thus described my invention what I claim and desire to secure by Letters Patent is:

1. A windshield scraper comprising a body portion of a double thickness of sheet material carrying therebetween in clamped relation an electric heating element in circuit with a source of electricity and one wall of said body portion elongated and bent to form a scraping edge heated by said heating element.

2. A windshield scraper having a body portion composed of a double thickness of sheet material having clamped therebetween throughout its length an electric heating element in circuit with a source of electricity, and one wall of said body portion elongated and bent towards the other wall at an oblique angle to form a scraping edge heated by said heating element.

3. In combination with a windshield cleaner mounted for reciprocation over a windshield glass, a scraper having an elongated body portion of a double thickness of sheet material carrying therebetween a heating element, one wall of said body portion elongated and forming a scraping edge, a bracket carried by the scraper and forming a means of attachment of the scraper to the cleaner, a grounding connection for said heating element between the windshield and said bracket, and a current connection between the heating element and a source of electricity.

4. A windshield scraper comprising an elongated body portion of a double thickness of sheet material having clamped therebetween an electric heating element, said heating element insulated in said body portion throughout its length but grounded to said body portion at one end, a block of insulated material mounted exteriorly of the opposite end of said body portion and carrying a plate having electrical connection with said heating element, one wall of said body portion bent to form a scraping edge, said body portion grounded electrically to the windshield, and said plate having electrical connection with a source of electric supply.

5. A windshield scraper comprising an elongated body portion bent backwardly upon itself to form a housing open at one side, an electric heating element within said housing and in circuit with a source of electricity, and one wall of said body portion elongated and bent to form a scraping edge heated by said heating element.

6. A windshield scraper comprising an elongated body portion composed of sheet material bent backwardly upon itself to form a housing, an electric heating element in said housing in circuit with a source of electricity, and one wall of said body portion elongated and bent to form a scraping edge heated by said heating element.

7. In combination with a windshield cleaner supported for reciprocal engagement with a windshield glass by a pivotally mounted driving arm having pivotal connection with the cleaner intermediate its length, an electrically heated scraper having resilient connection with the pivotal connection between the driving arm and the cleaner, said connection positioning the scraper in separated parallel relation to the cleaner and assuring a scraping engagement between the scraper and the windshield glass throughout the length of the scraper at all times.

In testimony whereof I hereunto affix my signature.

FRANK HOOVER.